United States Patent
Koike

(10) Patent No.: US 10,955,333 B2
(45) Date of Patent: Mar. 23, 2021

(54) SYSTEM AND METHOD FOR CALCULATING MARGIN OF FRICTION COEFFICIENT AT TIRE CONTACT PATCH

(71) Applicant: TOYO TIRE & RUBBER CO., LTD., Itami (JP)

(72) Inventor: Akihiro Koike, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 311 days.

(21) Appl. No.: 16/148,445

(22) Filed: Oct. 1, 2018

(65) Prior Publication Data
US 2019/0113440 A1 Apr. 18, 2019

(30) Foreign Application Priority Data
Oct. 17, 2017 (JP) .............................. JP2017-200832

(51) Int. Cl.
*G01N 19/02* (2006.01)
*G07C 5/08* (2006.01)
(Continued)

(52) U.S. Cl.
CPC .............. *G01N 19/02* (2013.01); *B60T 8/172* (2013.01); *B60W 40/068* (2013.01);
(Continued)

(58) Field of Classification Search
CPC .... G01N 19/02; G01M 17/022; G01M 17/02; G07C 5/0808; B29D 30/0061
See application file for complete search history.

(56) References Cited

U.S. PATENT DOCUMENTS

| 8,666,562 B2 * | 3/2014 | Tuononen ............... B60T 8/172 701/1 |
| 2005/0159874 A1 | 7/2005 | Bertrand |

(Continued)

FOREIGN PATENT DOCUMENTS

| DE | 197 04 605 C1 | 6/1998 |
| JP | 9-26382 A | 1/1997 |
| JP | 2014-21012 A | 2/2014 |

OTHER PUBLICATIONS

O. Nishihara and K. Masahiko, "Estimation of Road Friction Coefficient Based on the Brush Model", Journal of Dynamic Systems, Measurement, and Control Jul. 2011, vol. 133 (Year: 2011).*
(Continued)

*Primary Examiner* — Alexander Satanovsky
*Assistant Examiner* — Douglas Kay
(74) *Attorney, Agent, or Firm* — Westerman, Hattori, Daniels & Adrian, LLP

(57) ABSTRACT

A method having: acquiring pressure distribution data at which there are a plurality of measurement points for which forces along three axes have been measured; calculating friction coefficients based on the forces along the three axes at the respective measurement points; generating associated data, linking a contact patch pressure and a maximum friction coefficient that is capable of being exhibited at the contact patch pressure, for a plurality of situations based on a single situation represented by a contact patch pressure and a friction coefficient exhibited at the contact patch pressure at a single measurement point; identifying maximum friction coefficients corresponding to contact patch pressures at respective measurement points based on the associated data; and calculating a margin of the friction coefficient, which is a difference between the maximum friction coefficient and the friction coefficient.

4 Claims, 9 Drawing Sheets

(51) Int. Cl.
*G01M 17/02* (2006.01)
*B60T 8/172* (2006.01)
*B60W 40/068* (2012.01)
*B29D 30/00* (2006.01)

(52) U.S. Cl.
CPC .......... *G01M 17/02* (2013.01); *G01M 17/022* (2013.01); *G07C 5/0808* (2013.01); *B29D 30/0061* (2013.01)

(56) References Cited

U.S. PATENT DOCUMENTS

| | | | | |
|---|---|---|---|---|
| 2010/0114449 | A1* | 5/2010 | Shiozawa | B60T 8/172 701/90 |
| 2011/0209521 | A1* | 9/2011 | Shiozawa | B60L 15/2036 73/9 |
| 2011/0264300 | A1* | 10/2011 | Tuononen | B60T 8/172 701/1 |
| 2015/0135812 | A1* | 5/2015 | Kuwayama | G01M 17/022 73/146 |
| 2016/0207360 | A1* | 7/2016 | Saeki | B60C 11/12 |

OTHER PUBLICATIONS

Extended European Search Report dated Mar. 14, 2019, issued in counterpart EP application 18198196.0. (8 pages).

\* cited by examiner

SYSTEM AND METHOD FOR CALCULATING MARGIN OF FRICTION COEFFICIENT AT TIRE CONTACT PATCH

BACKGROUND OF THE INVENTION

Field of the Invention

The present disclosure is related to a system and method for calculating a degree of underutilized potential improvement at a tire contact patch.

Description of the Related Art

As a method for measuring the ground contact characteristics of a rolling tire, Japanese Patent Application Publication Kokai No. 2014-21012, for example, discloses a method in which a tire is brought into contact with a rotating drum equipped with a force sensor, the rotating drum and the tire are made to rotate together, the sensor and the tire are brought into contact, and the sensor is used to measure the ground contact characteristics of the tire. A three-axis force sensor is employed as the force sensor, tire contact patch pressure, shear stress in the tire width direction, and shear stress in the tire circumferential direction are measured. There is a description to the effect that the interrelationship among the distributions of the forces along these three axes makes it possible to calculate the friction coefficient μ at any arbitrary location, making it possible to know the distribution of the friction coefficient μ.

As another measurement method. Japanese Patent Application Publication Kokai No. H09[1997]-26382 discloses a method in which the measurement apparatus is not a three-axis force sensor but in which a tire is brought into contact with a planar stage equipped with the measurement apparatus, and ground contact characteristics are measured as the tire is made to roll over the measurement apparatus.

At Japanese Patent Application Publication Kokai No. 2014-21012, there is a description to the effect that it is possible to know the distribution of the friction coefficient μ of a tire. However, even if Japanese Patent Application Publication Kokai No. 2014-21012 might allow one to see the distribution of the friction coefficient μ, it still does not allow a tire designer to instantly know which locations within the overall tire contact patch have room for improvement. It is preferred for any given contact patch pressure that the maximum friction coefficient $\mu_{MAX}$, for the contact patch pressure that is capable of being applied by the tire, actually be applied by the tire. However, there are situations in which the friction coefficient μ for the contact patch pressure that is actually applied by the tire is less than the maximum friction coefficient $\mu_{MAX}$. In such situations, there will be a difference between the maximum friction coefficient and the friction coefficient. And, because this difference will represent the margin of the friction coefficient, it is fair to say that there is room for improvement at such location(s).

SUMMARY OF INVENTION

The present disclosure was conceived in view of such problems, it being an object thereof to provide a system and method for calculating the margin of the friction coefficient at a tire contact patch.

To solve the foregoing problem, the present disclosure employs means as described below.

In other words, according to the present disclosure, there is provided a method for calculating a margin of a friction coefficient at a tire contact patch comprising:

acquiring pressure distribution data at which there are a plurality of measurement points for which forces along three axes have been measured by a force sensor provided at a road that is contacted by a tire;

calculating friction coefficients based on the forces along the three axes at the respective measurement points;

generating associated data, linking a contact patch pressure and a maximum friction coefficient that is capable of being exhibited at the contact patch pressure, for a plurality of situations based on a single situation represented by a contact patch pressure and a friction coefficient exhibited at the contact patch pressure at a single measurement point;

identifying maximum friction coefficients corresponding to contact patch pressures at respective measurement points based on the associated data; and calculating a margin of the friction coefficient, which is a difference between the maximum friction coefficient and the friction coefficient μ, at each of the respective measurement points.

The margin of the friction coefficient is thus calculated, meaning that the greater the margin the more room there is for improvement. This therefore makes it possible for a designer to intuitively know which locations have room for improvement based on the magnitude of the margin.

DETAILED DESCRIPTION OF THE PREFERRED EMBODIMENTS

Below, an embodiment in accordance with the present disclosure is described with reference to the drawings.

Tire Ground Contact Characteristics Measurement Device

Figure 1:
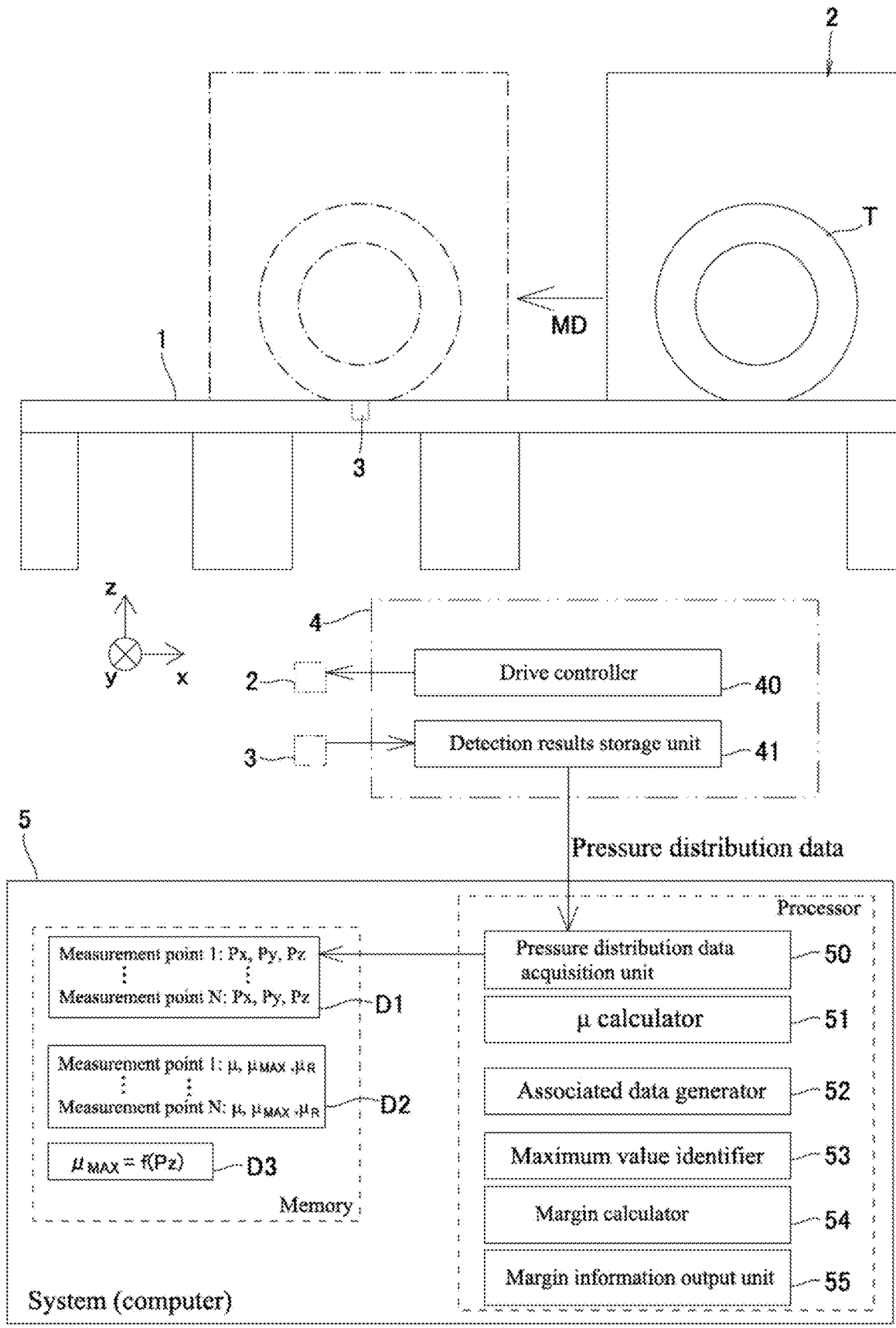
FIG. 1 Block diagram and side view showing system for calculating margin of friction coefficient and a tire ground contact characteristics measurement device in accordance with the present disclosure FIG. 2 Flowchart showing routine for processing to calculate margin of μ which is executed by system FIG. 3 Graph of distribution of contact patch pressure Pz FIG. 4 Graph of distribution of width direction pressure Py FIG. 5 Graph of distribution of friction coefficient μ

As shown in FIG. 1, a tire ground contact characteristics measurement device has travel surface 1 for allowing travel by tire T thereon, tire drive apparatus 2 which causes tire T to be brought into contact with and to roll on travel surface 1, force sensor 3 which is provided on travel surface 1, and measurement controller 4 which is implemented by means of a computer.

Travel surface 1 appears rectangular as seen in plan view, being a flat surface. Force sensor 3 has a detection region, force being measured in the form of a single measurement point at the detection region when tire T comes in contact with the detection region. Force sensor 3 is a three-axis force sensor and is capable of measuring circumferential direction shear pressure Px [kPa], width direction shear pressure Py [kPa], and contact patch pressure Pz [kPa] at the location at which contact with the tire occurs. A plurality of force sensors 3 are arrayed along prescribed direction(s) in array-like fashion so as to constitute sensor group(s).

As shown in FIG. 1, tire drive apparatus 2 causes tire T to be pressed against and approach travel surface 1, sliding movement along the direction MD of travel of the tire causing tire T to be made to roll. The location at which contact between force sensor 3 and tire T occurs is capable of being adjusted by changing the location at which rolling of tire T is initiated.

Measurement controller 4 has tire drive controller 40 which controls driving of the tire drive apparatus 2, and detection results storage unit 41 which stores results of detection by force sensor 3 following receipt of a signal by the sensor.

System for Calculating Margin of Friction Coefficient

As shown in FIG. 1, system 5 calculates a margin of the friction coefficient at a tire contact patch based on a pressure distribution data measured by the ground contact characteristics measurement device. More specifically, system 5 has pressure distribution data acquisition unit 50, μ calculator 51, associated data generator 52, maximum value identifier 53, and margin calculator 54. System 5 may further have margin information output unit 55. These respective units 50 through 55 are implemented in cooperative fashion in software and hardware as a result of execution of previously stored μ margin calculation processing routine(s) by CPU(s) at computer(s) equipped with CPU(s), memory or memories, various interfaces), and so forth.

Figure 3:
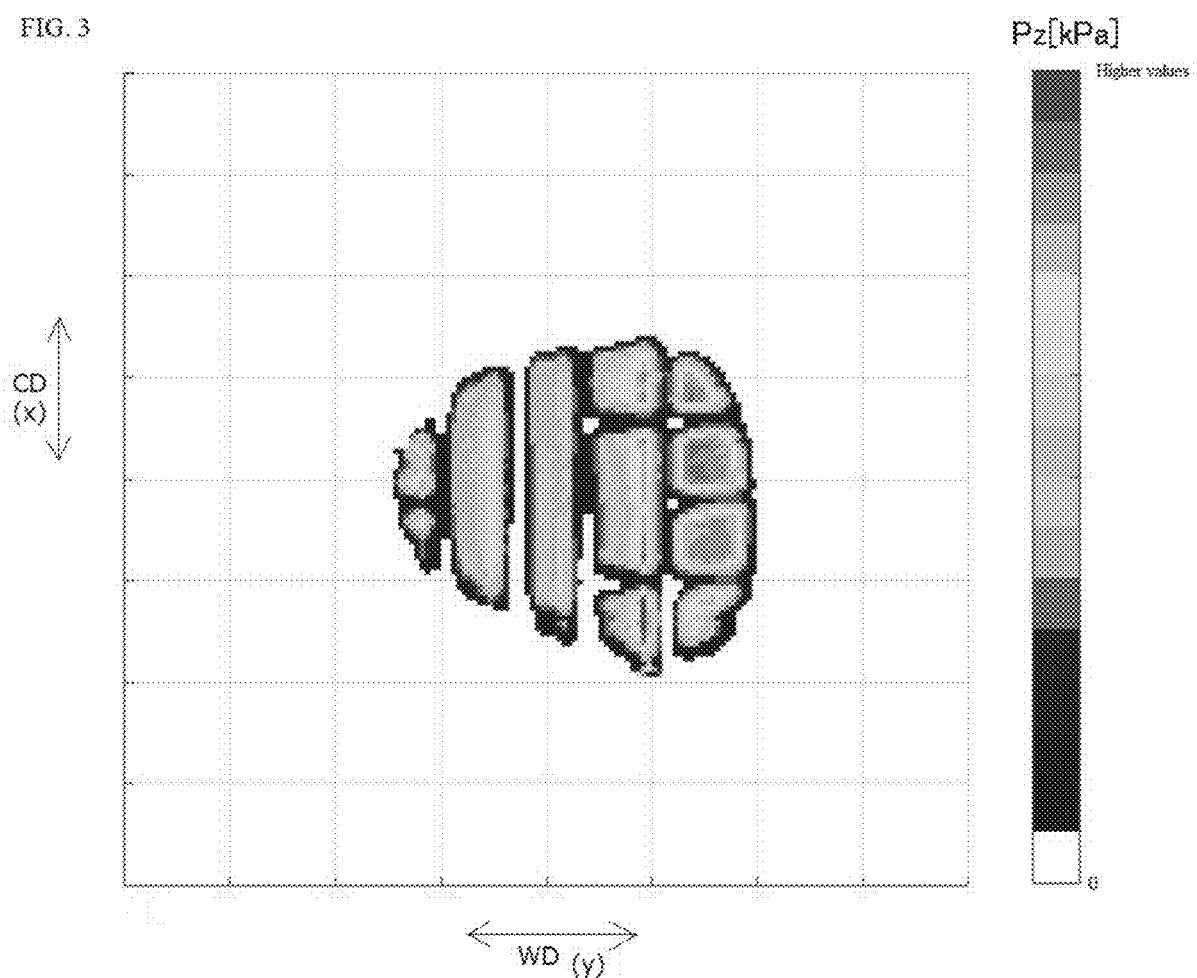
Figure 4:
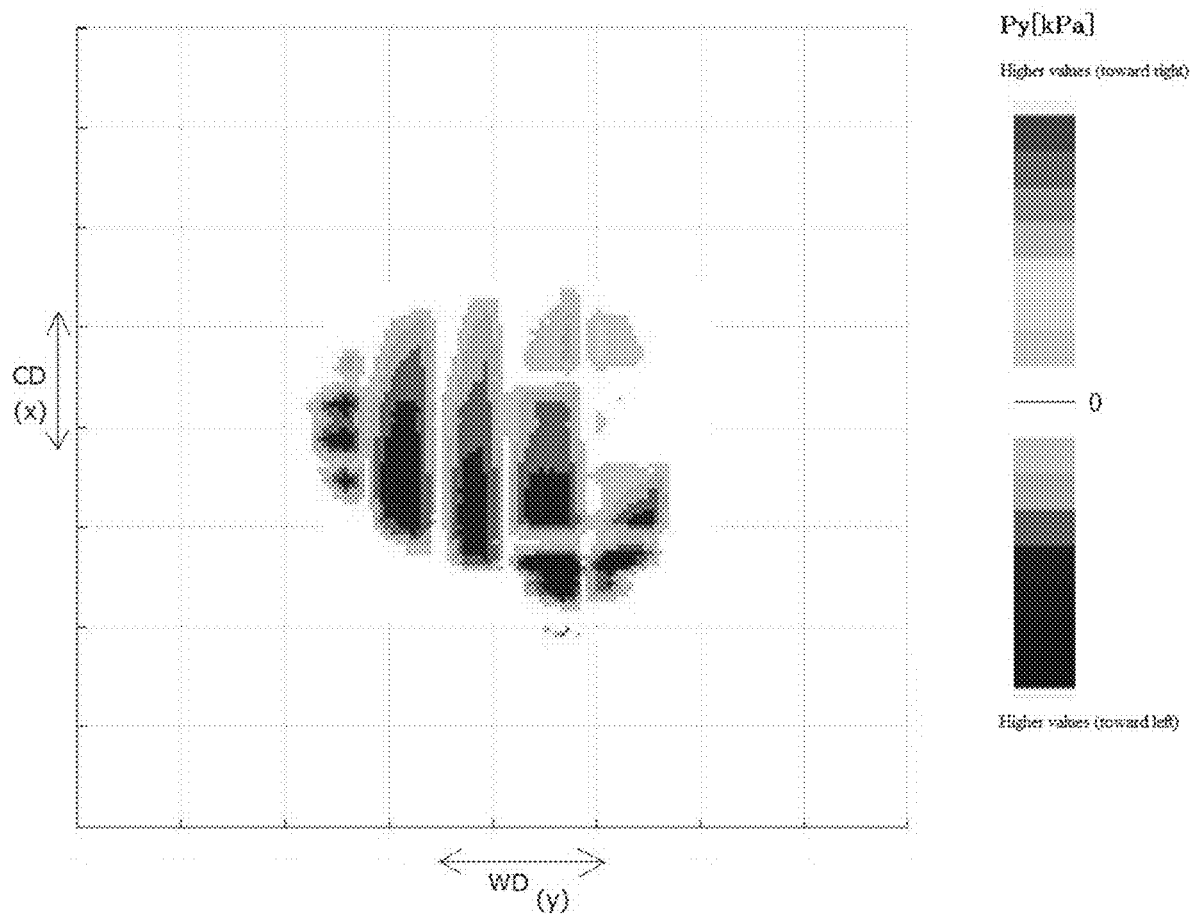
Figure 5:
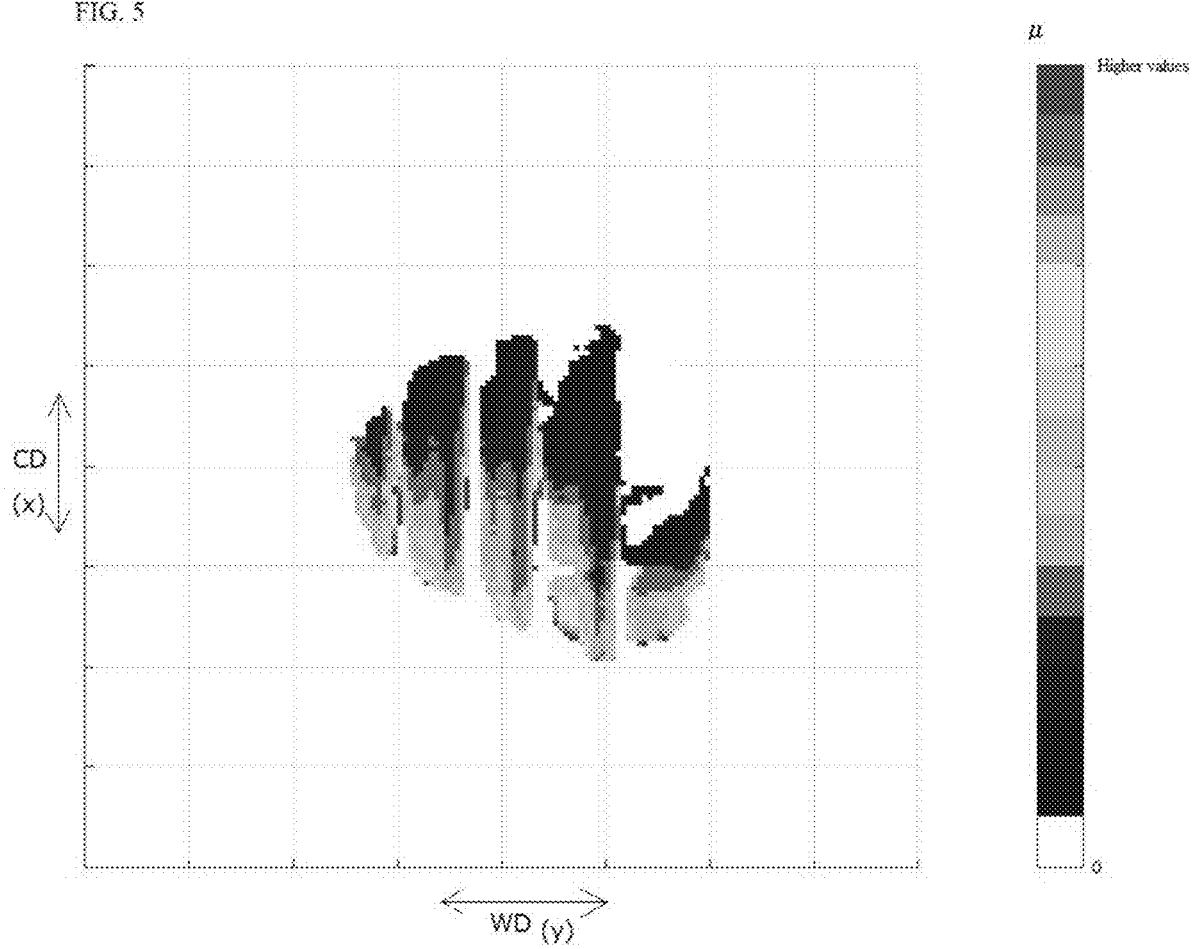

Pressure distribution data acquisition unit 50 shown in FIG. 1 acquires pressure distribution data D1 measured by the ground contact characteristics measurement device. At pressure distribution data D1, there are a plurality of measurement points for which forces along three axes (circumferential direction pressure Px, width direction pressure Py, and contact patch pressure Pz) have been measured. There are N measurement points. By plotting contact patch pressure Pz for all measurement points among the pressure distribution data D1, it is possible to obtain a graph of the distribution of contact patch pressure Pz as shown in FIG. 3. By plotting width direction pressure Py for all measurement points among the pressure distribution data D1, it is possible to obtain a graph of the distribution of width direction pressure Py as shown in FIG. 4. At FIG. 3 and FIG. 4, the vertical axis is the tire circumferential direction CD, and the horizontal axis is the tire width direction WD. Magnitude of pressure is indicated by color as shown in the legend inset at the graph. Here, note that a graph of the distribution of circumferential direction pressure Px is not shown in the drawings. Here, while a graph showing distribution of circumferential direction pressure Px is not shown in the drawings, note that a graph of the distribution of circumferential direction pressure Px may be produced in similar fashion as has been shown for width direction pressure Py and contact patch pressure Pz. Note that the pressure distribution data D1 shown here is the result of measurements made during cornering sufficient to produce an acceleration of 0.4 G consistent with a slip angle of approximately 1.1° acting on a tire of size 205/60R15, under a load of 3.64 [kN], with an internal pressure of 230 [kPa], and having a basic groove pattern in which there were lateral grooves and sipes.

μ calculator 51 shown in FIG. 1 calculates friction coefficients μ exhibited at respective measurement points based on the forces along three axes (Px, Py, and Pz) measured at those measurement points. Results of calculation of friction coefficients μ are stored in memory as working data D2. Friction coefficients μ are calculated for all measurement points. Friction coefficient μ can be calculated by dividing the vector sum of circumferential direction pressure Px and width direction pressure Py by contact patch pressure Pz. By plotting the calculated friction coefficients μ, it is possible to obtain a graph of the distribution of friction coefficient μ as shown in FIG. 5. At FIG. 5, the vertical axis is the tire circumferential direction CD, and the horizontal axis is the tire width direction WD. Magnitude of friction coefficient μ is indicated by color as shown in the legend inset at the graph.

Associated data generator 52 shown in FIG. 1 generates associated data D3 for a plurality of situations based on the single situation represented by the contact patch pressure Pz and the friction coefficient μ exhibited at contact patch pressure Pz at a single measurement point. Associated data D3 is data in which contact patch pressure Pz and the maximum friction coefficient $\mu_{MAX}$ that is capable of being exhibited at contact patch pressure Pz are mutually linked. The associated data D3 which is generated is stored in memory. Whereas associated data D3 in the present embodiment is the formula "$\mu_{MAX}$=f(Pz)" which takes the argument contact patch pressure Pz and outputs maximum friction coefficient $\mu_{MAX}$ as a function thereof (see discussions below regarding maximum friction coefficient $\mu_{MAX}$), there is no limitation with respect thereto. For example, a table may be provided that stores a plurality of data pairs, each data pair consisting of a contact patch pressure Pz and a maximum friction coefficient $\mu_{MAX}$ which is linked thereto, such that a search may be carried out when a contact patch pressure Pz value is input thereto so as to permit the maximum friction coefficient $\mu_{MAX}$ that is linked therewith to be output therefrom. And in the event that the contact patch pressure Pz value which is input thereto is not present in the table, interpolation might be carried out so as to permit the interpolated maximum friction coefficient $\mu_{MAX}$ to be output therefrom. Or associated data may be implemented by any of various other methods.

Figure 6:
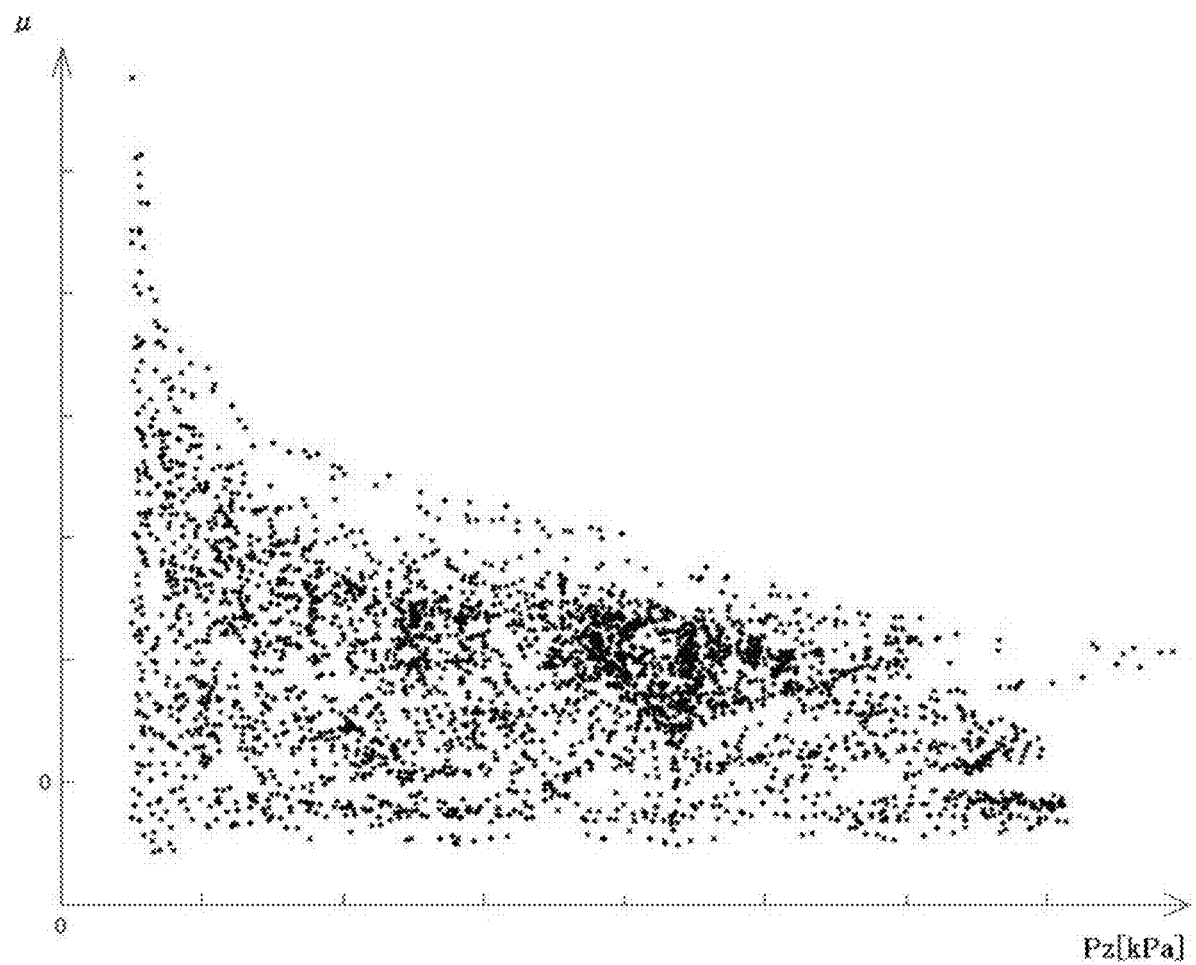
FIG. 6 Graph on which friction coefficient μ and contact patch pressure Pz are plotted FIG. 7 Drawing to assist in description related to associated data FIG. 8 Graph of distribution of maximum friction coefficient $\mu_{MAX}$ FIG. 9 Graph of distribution of margin of friction coefficient $\mu_R$
Figure 7:
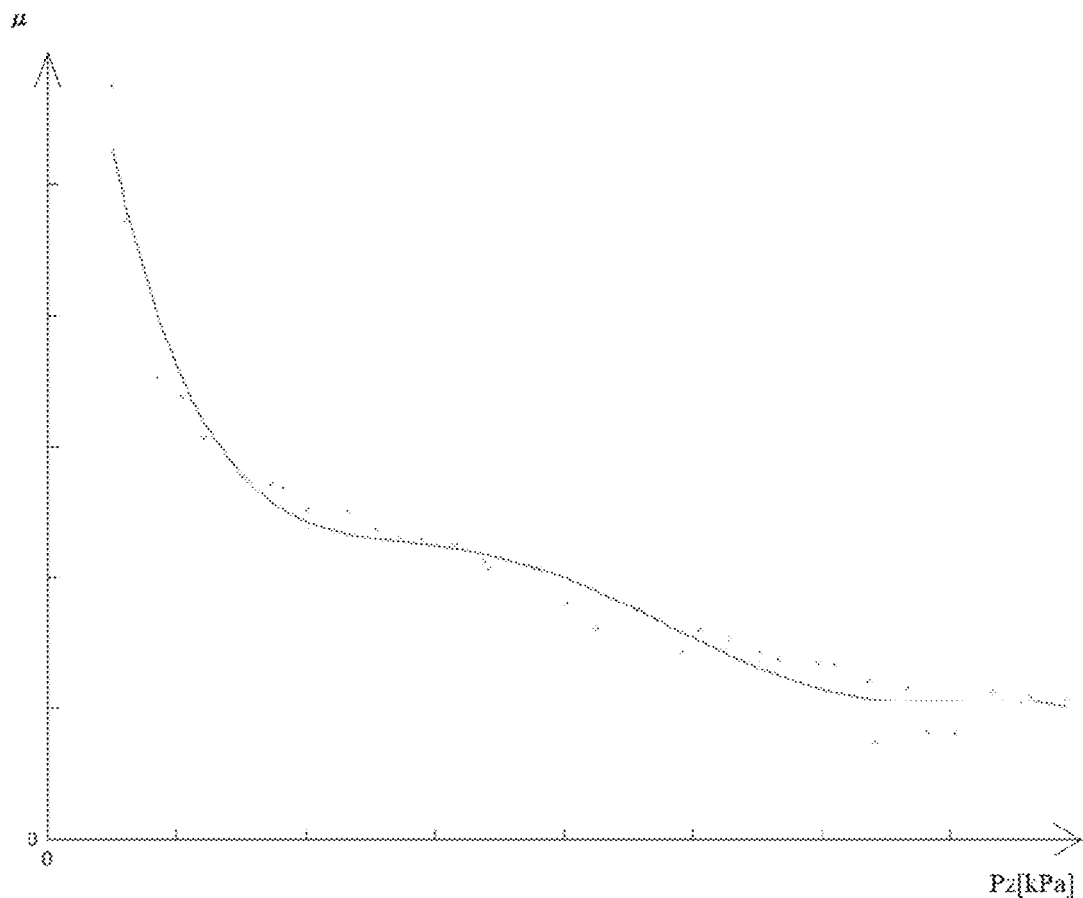

In accordance with the present embodiment, as shown in FIG. 6, each measurement point is represented by a single point in which friction coefficient μ is plotted on the vertical axis and contact patch pressure Pz is plotted on the horizontal axis; and as shown in FIG. 7, contact patch pressure Pz is varied, a plurality of maximum friction coefficients $\mu_{MAX}$ are extracted, and an approximation formula is used to approximate the plurality of maximum friction coefficients $\mu_{MAX}$.

Specifically, taking a plurality of friction coefficients μ which correspond to a contact patch pressure of interest, processing in which a prescribed number of values are extracted therefrom in order from those having the highest values is carried out a plurality of times, the foregoing contact patch pressure of interest being varied each time, and a formula is used to generate a best-fit approximation formula for the extracted friction coefficients. More specifically, a plurality of measurement points were divided by contact patch pressure Pz into sets of prescribed range (10 kPa in the present embodiment), and for each (10 kPa) set, a prescribed number (two in the present embodiment) of values were extracted therefrom in order from those having the highest values of friction coefficient μ. As shown in FIG. 7, a prescribed formula (fifth-order formula in the present embodiment) was used to obtain a best-fit approximation formula "$\mu_{MAX}$=f(Pz)" for the extracted values. In obtaining the best-fit approximation formula, the least-squares method was employed. This is merely one example of data processing, there being no limitation with respect thereto.

Figure 8:
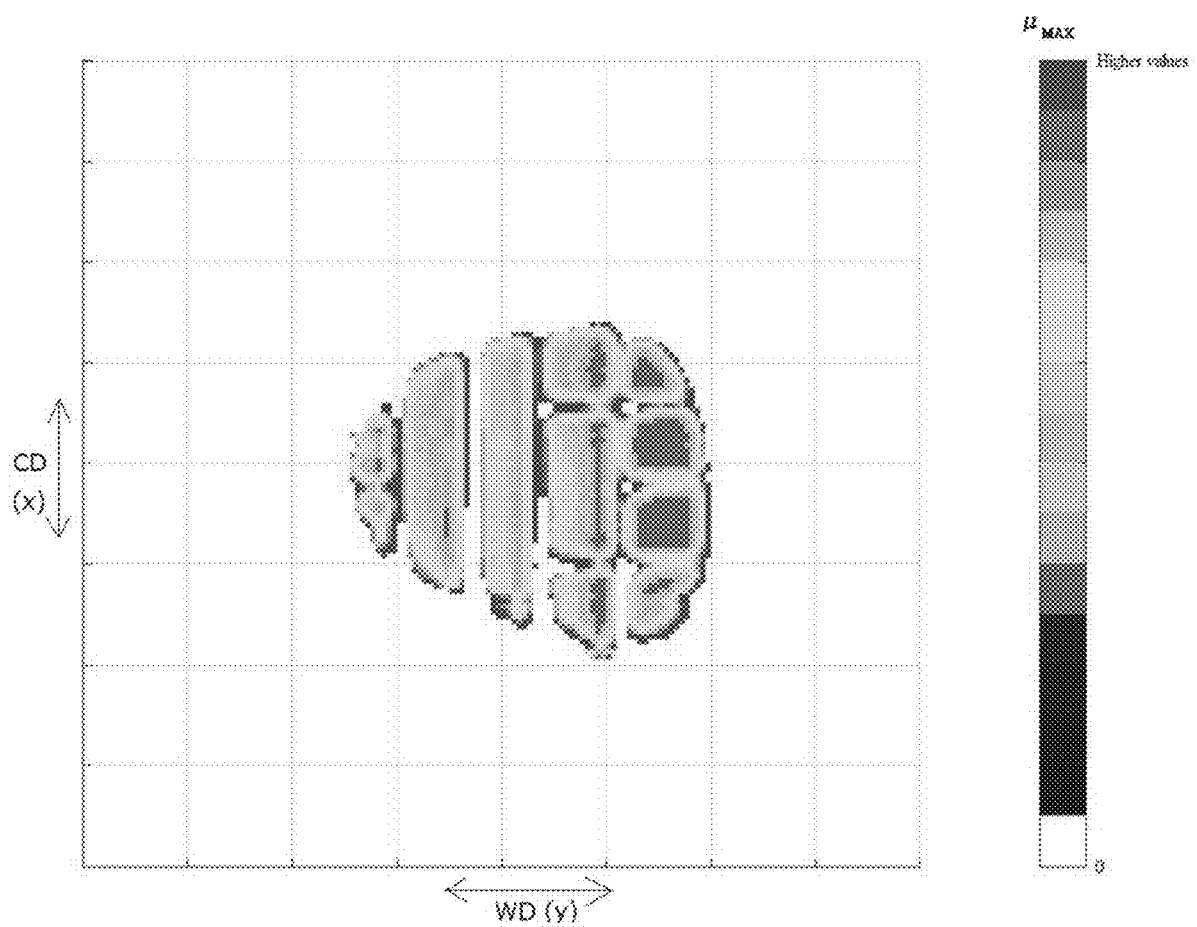

Maximum value identifier 53 shown in FIG. 1 identifies maximum friction coefficients $\mu_{MAX}$ corresponding to contact patch pressures Pz at respective measurement points based on associated data D3. Approximation formula "$\mu_{MAX}$=f(Pz)" which is associated data D3 is used to calculate maximum friction coefficient $\mu_{MAX}$ for all measurement points for which a contact patch pressure Pz exists. The maximum friction coefficients $\mu_{MAX}$ which are calculated are stored in memory as working data D2. By plotting the calculated maximum friction coefficients $\mu_{MAX}$, it is possible to obtain a graph of the distribution of maximum friction coefficient $\mu_{MAX}$ as shown in FIG. 8. At FIG. 8, the vertical axis is the tire circumferential direction CD, and the horizontal axis is the tire width direction WD. Magnitude of maximum friction coefficient $\mu_{MAX}$ is indicated by color as shown in the legend inset at the graph.

Figure 9:
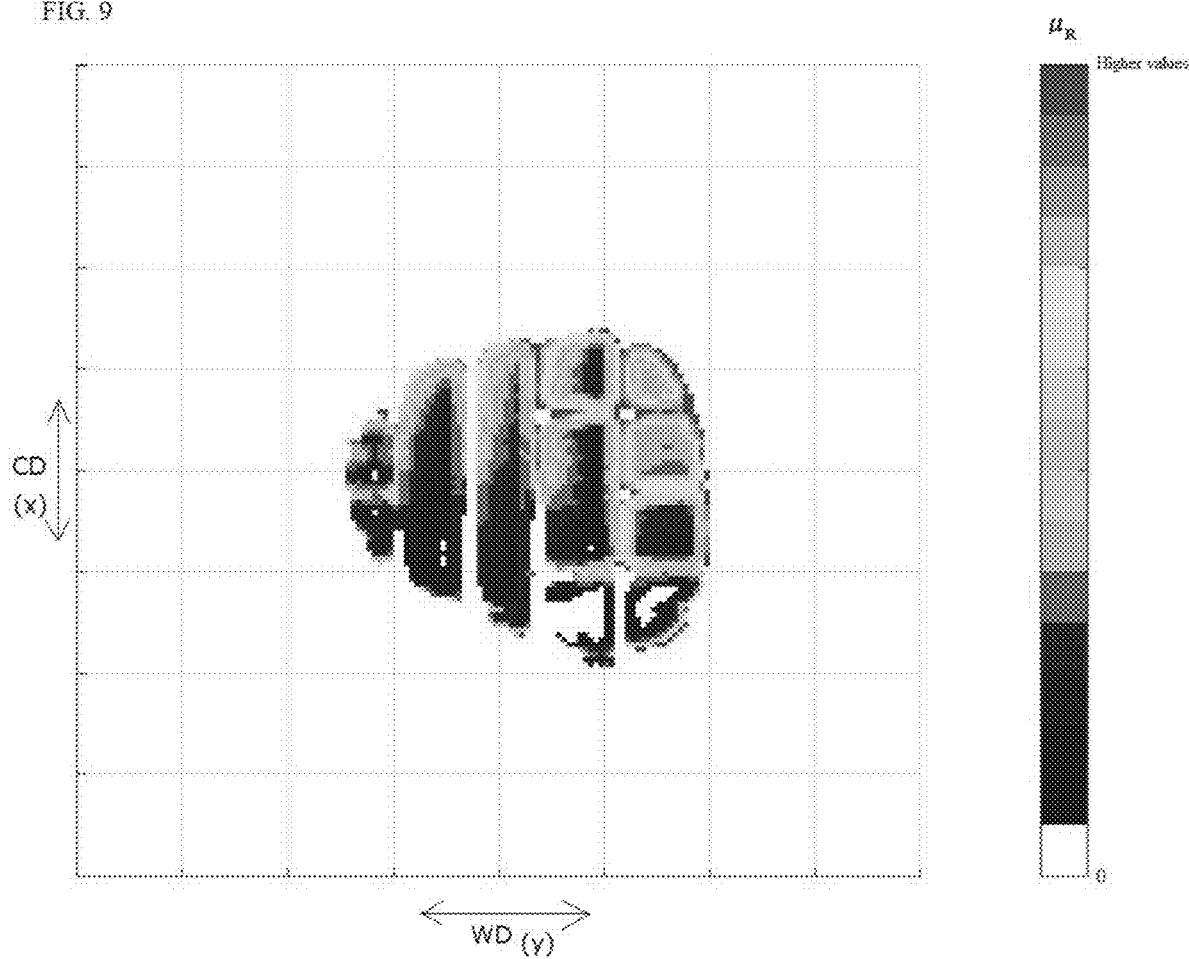

Margin calculator 54 shown in FIG. 1 calculates the margin of the friction coefficient $\mu_R$, which is the difference between the maximum friction coefficient $\mu_{MAX}$ and the friction coefficient $\mu$ [$\mu_{MAX}$-$\mu$], at each of the respective measurement points. The margins of the friction coefficient $\mu_R$ which are calculated are stored in memory as working data D2. By plotting the calculated margins of the friction coefficient $\mu_R$, it is possible to obtain a graph of the distribution of the margin of the friction coefficient $\mu_R$ as shown in FIG. 9. At FIG. 9, the vertical axis is the tire circumferential direction CD, and the horizontal axis is the tire width direction WD. Magnitude of the margin of the friction coefficient $\mu_R$ is indicated by color as shown in the legend inset at the graph.

Margin information output unit 55 shown in FIG. 1 outputs information related to the margin of the friction coefficient $\mu_R$. One example of the form that such output might take is a graph of the distribution of the margin of the friction coefficient $\mu_R$ as shown in FIG. 9. Furthermore, in addition to the graph of the distribution of the margin of the friction coefficient $\mu_R$, at least one of the graph of distribution of friction coefficient $\mu$ which is exhibited that is shown in FIG. 5 and the graph of the distribution of maximum friction coefficient $\mu_{MAX}$ that is shown in FIG. 8 may be output.

As the manner in which output is carried out, this might be displayed on a display or image data might be output to an external location.

Furthermore, as information related to the margin of the friction coefficient $\mu_R$, margin information output unit 55 may display only locations for which the margin $\mu_R$ is at least some prescribed threshold value.

Method for Calculating Margin of Friction Coefficient

Figure 2:
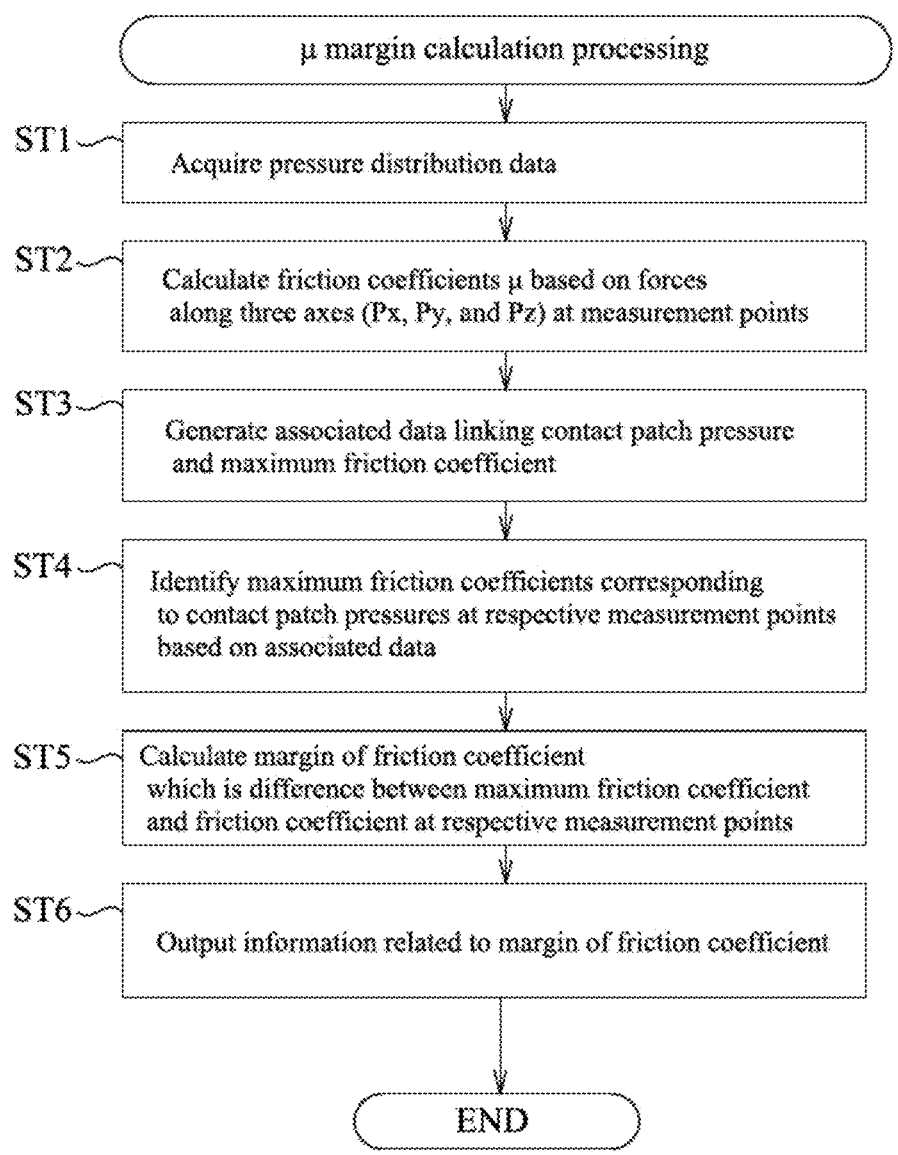

Operation of the foregoing system will be described with reference to FIGS. 1 and 2.

First, at step ST1, pressure distribution data acquisition unit 50 acquires pressure distribution data D1 at which there are a plurality of measurement points for which forces along three axes (Px, Py, and Pz) have been measured by force sensor 3 provided at the road that is contacted by the tire.

Next, at step ST2, $\mu$ calculator 51 calculates friction coefficients $\mu$ based on the forces along three axes (Px, Py, and Pz) at the respective measurement points.

Next, at step ST3, associated data generator 52 generates associated data D3, linking contact patch pressure Pz and the maximum friction coefficient $\mu_{MAX}$ that is capable of being exhibited at contact patch pressure Pz, for a plurality of situations based on the single situation represented by the contact patch pressure Pz and the friction coefficient $\mu$ exhibited at contact patch pressure Pz at a single measurement point.

Next, at step ST4, maximum value identifier 53 identifies maximum friction coefficients $\mu_{MAX}$ corresponding to contact patch pressures Pz at respective measurement points based on associated data D3.

Next, at step ST5, margin calculator 54 calculates the margin of the friction coefficient $\mu_R$, which is the difference between the maximum friction coefficient $\mu_{MAX}$ and the friction coefficient $\mu$ [$\mu_{MAX}$-$\mu$], at each of the respective measurement points.

Next, at step ST6, margin information output unit 55 outputs information related to the margin of the friction coefficient $\mu_R$.

As described above, the method for calculating a margin of a friction coefficient at a tire contact patch in accordance until the present embodiment is a method executed by a computer and comprises:

acquiring pressure distribution data D1 at which there are a plurality of measurement points for which forces along three axes (Px, Py, and Pz) have been measured by force sensor 3 provided at a road that is contacted by a tire (ST1);

calculating friction coefficients $\mu$ based on forces along three axes (Px, Py, and Pz) at the respective measurement points (ST2);

generating associated data D3, linking contact patch pressure Pz and the maximum friction coefficient $\mu_{MAX}$ that is capable of being exhibited at contact patch pressure Pz, for a plurality of situations based on the single situation represented by the contact patch pressure Pz and the friction coefficient $\mu$ exhibited at contact patch pressure Pz at a single measurement point (ST3);

identifying maximum friction coefficients $\mu_{MAX}$ corresponding to contact patch pressures Pz at respective measurement points based on associated data D3 (ST4); and calculating a margin of the friction coefficient $\mu_R$, which is the difference between the maximum friction coefficient $\mu_{MAX}$ and the friction coefficient $\mu$ [$\mu_{MAX}$-$\mu$], at each of the respective measurement points (ST5).

The system for calculating a margin of a friction coefficient at a tire contact patch in accordance with the present embodiment is provided with:

pressure distribution data acquisition unit 50 which acquires pressure distribution data D1 at which there are a plurality of measurement points for which forces along three axes (Px, Py, and Pz) have been measured by force sensor 3 provided at a road that is contacted by a tire;

$\mu$ calculator 51 which calculates friction coefficients $\mu$ based on forces along three axes (Px, Py, and Pz) at the respective measurement points;

associated data generator 52 which generates associated data D3, at which contact patch pressure Pz and the maximum friction coefficient $\mu_{MAX}$ that is capable of being exhibited at contact patch pressure Pz are mutually linked, for a plurality of situations based on the single situation represented by the contact patch pressure Pz and the friction coefficient $\mu$ exhibited at contact patch pressure Pz at a single measurement point;

maximum value identifier 53 which identifies maximum friction coefficients $\mu_{MAX}$ corresponding to contact patch pressures Pz at respective measurement points based on associated data D3; and margin calculator 54 which calculates a margin of the friction coefficient $\mu_R$, which is the difference between the maximum friction coefficient $\mu_{MAX}$ and the friction coefficient $\mu$ [$\mu_{MAX}$−$\mu$], at each of the respective measurement points.

The margin of the friction coefficient $\mu_R$ is thus calculated, meaning that the greater the margin $\mu_R$ the more room there is for improvement. This therefore makes it possible for a designer to intuitively know which locations have room for improvement based on the magnitude of the margin $\mu_R$.

The method of the present embodiment comprises outputting information related to the margin of the friction coefficient $\mu_R$ (ST6).

The system of the present embodiment is provided with margin information output unit 55 which outputs information related to the margin of the friction coefficient $\mu_R$.

As a result of adoption of such constitution, it is possible for a designer to intuitively know the locations at which there is room for improvement.

Program(s) in accordance with the present embodiment cause computer(s) to execute the respective steps that make up the foregoing method.

The operation and effects provided by the foregoing method can also be obtained as a result of execution of such program(s). In other words, it might be said that such program(s) make use of the foregoing method.

The foregoing measurement device carries out measurements while causing the tire to roll very slowly. Friction coefficient $\mu$ varies in correspondence to contact patch pressure Pz and sliding speed. By causing the tire to roll very slowly it is therefore possible to ignore sliding speed, making it possible to improve precision. Conversely, where the tire does not roll very slowly but has an appreciable sliding speed, while precision will be reduced in correspondence to the magnitude thereof, it will still be possible to calculate the margin of the friction coefficient $\mu_R$, for which reason the method of the present disclosure will be effective.

While embodiments in accordance with the present disclosure have been described above with reference to the drawings, it should be understood that the specific constitution thereof is not limited to these embodiments. The scope of the present disclosure is as indicated by the claims and not merely as described at the foregoing embodiments, and moreover includes all variations within the scope of or equivalent in meaning to that which is recited in the claims.

Except where the output of previous processing is used in subsequent processing, the order of execution of operations, procedures, steps, stages, and other such respective processing taking place, for example, in the context of the device(s), system(s), program(s), and method(s) indicated in the claims, specification, and drawings may be implemented in any desired order. Although words such as "first," "next," and so forth may be employed for convenience of description when explaining the flow of activities occurring in the context of the claims, specification, and drawings, this should not be understood to imply that execution must be carried out in that order.

For example, whereas units 50 through 55 shown in FIG. 1 are implemented by causing CPU(s) of computer(s) to execute prescribed program(s), the respective units may be constituted from dedicated memory or memories and/or dedicated circuitry.

At the system of the present embodiment, whereas respective units 50 through 55 are implemented in the context of a single computer, respective units 50 through 55 may be implemented in distributed fashion by a plurality of computers. That is, the foregoing method may be executed by one processor or by a plurality of processors.

Structure employed at any of the foregoing embodiment(s) may be employed as desired at any other embodiment(s). The specific constitution of the various components is not limited only to the foregoing embodiment(s) but admits of any number of variations without departing from the gist of the present disclosure.

The invention claimed is:

1. A method for determining ground contact characteristics of a tire comprising:
rotating the tire over a plurality of measurement points on a surface including a force sensor at the plurality of measurement points, with an applied pressure of the tire against the surface at a contact patch between the tire and the surface, the force sensor measuring forces along three axes;
acquiring pressure distribution data from the forces measured by the force sensor at the plurality of measurement points;
calculating friction coefficients based on the forces along the three axes at the respective measurement points;
generating associated data, linking a contact patch pressure at the contact patch and a maximum friction coefficient that is capable of being exhibited at the contact patch pressure, for a plurality of situations based on a single situation represented by the contact patch pressure and the friction coefficient exhibited at the contact patch pressure at a single measurement point;
identifying maximum friction coefficients corresponding to contact patch pressures at respective measurement points based on the associated data;
and calculating a margin of the friction coefficient, which is a difference between the maximum friction coefficient and the friction coefficient, at each of the respective measurement points, wherein the ground contact characteristics of the tire including the margin of the friction coefficient at each of the respective measurement points.

2. The method according to claim 1 further comprising outputting information related to the margin of the friction coefficient.

3. A system for determining ground contact characteristics of a tire comprising:
a tire drive apparatus rotating the tire over a plurality of measurement points on a surface including a force sensor at the plurality of measurement points, with an applied pressure of the tire against the surface at a contact patch between the tire and the surface, the force sensor measuring forces along three axes;
a memory storing program instructions;
and a processor coupled to the memory and configured to execute the program instructions to cause the processor to:
acquire pressure distribution data from the forces measured by the force sensor at the plurality of measurement points;
calculate friction coefficients based on the forces along the three axes at the respective measurement points;
generate associated data, linking a contact patch pressure at the contact patch and a maximum friction coefficient that is capable of being exhibited at the contact patch pressure, for a plurality of situations based on a single situation represented by the contact patch pressure and the friction coefficient exhibited at the contact patch pressure at a single measurement point;

identify maximum friction coefficients corresponding to contact patch pressures at respective measurement points based on the associated data;

and calculate a margin of the friction coefficient, which is a difference between the maximum friction coefficient and the friction coefficient, at each of the respective measurement points, wherein the ground contact characteristics of the tire including the margin of the friction coefficient at each of the respective measurement points.

4. The system according to claim 3, wherein the processor is further configured to output information related to the margin of the friction coefficient.

\* \* \* \* \*